United States Patent
Han et al.

(10) Patent No.: US 11,218,737 B2
(45) Date of Patent: Jan. 4, 2022

(54) ASYMMETRIC PROBABILITY MODEL UPDATE AND ENTROPY CODING PRECISION

(71) Applicant: GOOGLE LLC, Mountain View, CA (US)

(72) Inventors: Jingning Han, Santa Clara, CA (US); Aki Kuusela, Palo Alto, CA (US); Stanislav Vitvitskyy, Mountain View, CA (US); Yaowu Xu, Saratoga, CA (US); Ching-Han Chiang, San Jose, CA (US); Dake He, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 567 days.

(21) Appl. No.: 16/042,261

(22) Filed: Jul. 23, 2018

(65) Prior Publication Data
US 2020/0029098 A1 Jan. 23, 2020

(51) Int. Cl.
| | |
|---|---|
| *H04N 19/91* | (2014.01) |
| *H04N 19/44* | (2014.01) |
| *H04N 19/61* | (2014.01) |
| *H04N 19/70* | (2014.01) |

(52) U.S. Cl.
CPC ............ *H04N 19/91* (2014.11); *H04N 19/44* (2014.11); *H04N 19/61* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 5,541,595 | A | 7/1996 | Meyer |
| 6,906,647 | B2 | 6/2005 | Bossen |
| 7,796,065 | B2 | 9/2010 | Fenney |
| 9,455,744 | B2 | 9/2016 | George et al. |
| 2006/0197689 | A1 | 9/2006 | Lin et al. |

(Continued)

OTHER PUBLICATIONS

Bankoski, et al., "Technical Overview of VP8, An Open Source Video Codec for the Web", Jul. 11, 2011, 6 pp.

(Continued)

*Primary Examiner* — Stuart D Bennett
(74) *Attorney, Agent, or Firm* — Young Basile Hanlon & MacFarlane, P.C.

(57) ABSTRACT

Asymmetric probability model updating and entropy coding includes using different numbers of bits for storing probabilities of a probability model and for entropy coding symbols using that probability model. The probabilities of a probability model are updated according to values of syntax elements decoded from a bitstream. The probabilities are associated with possible values of the syntax elements and are stored using a first bit precision. Based on the updated probabilities, a second bit precision to use to entropy decode the syntax elements is determined. The second bit precision is less than the first bit precision. The syntax elements are then entropy decoded using the second bit precision, such as to produce quantized transform coefficients, which may be further processed and output to an output video stream. Using the first bit precision to entropy decode the syntax elements results in a lower compression throughput than using the second bit precision.

20 Claims, 8 Drawing Sheets

(56) References Cited

U.S. PATENT DOCUMENTS

2017/0339413 A1  11/2017  Alshin et al.
2018/0205952 A1*  7/2018  Said .................... H03M 7/6011
2019/0158837 A1*  5/2019  Zhang .................. H04N 19/17
2020/0322610 A1*  10/2020  Leleannec ............ H04N 19/157

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

| NUMBER OF MSBs | 8 MSBs | 7 MSBs | 6 MSBs | 5 MSBs |
|---|---|---|---|---|
| COMPRESSION EFFICIENCY CHANGE | 0.035% | 0.060% | 0.123% | 0.446% |
| THROUGHPUT INCREASE | 1.875x | 2.143x | 2.500x | 3.000x |

FIG. 8

ASYMMETRIC PROBABILITY MODEL UPDATE AND ENTROPY CODING PRECISION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including encoding or decoding techniques.

SUMMARY

A method for decoding encoded video data using a bit precision determined based on a probability model according to an implementation of this disclosure comprises decoding syntax elements representing the encoded video data from a bitstream. The method further comprises updating probabilities of a probability model according to values of the syntax elements. The probabilities are associated with possible values of the syntax elements and are stored using a first bit precision. The method further comprises determining, based on the updated probabilities, a second bit precision to use to entropy decode the syntax elements. The second bit precision is less than the first bit precision. The method further comprises entropy decoding the syntax elements using the second bit precision to produce quantized transform coefficients. The method further comprises dequantizing the quantized transform coefficients to produce transform coefficients. The method further comprises inverse transforming the transform coefficients to produce a prediction residual. The method further comprises reconstructing the prediction residual to produce a decoded block. The method further comprises outputting the decoded block to an output video stream.

An apparatus for decoding encoded video data according to an implementation of this disclosure comprises a processor configured to execute instructions stored in a non-transitory storage medium. The instructions include instructions to receive symbols associated with the encoded video data. The instructions further include instructions to update a probability model based on values of the symbols. The probability model includes probabilities associated with possible values of the symbols and stored using a first number of bits. The instructions further include instructions to determine, based on the updated probability model, a second number of bits to use to entropy decode the symbols. The second number of bits is a subset of the first number of bits. The instructions further include instructions to entropy decode the symbols using the second number of bits.

A decoder according to an implementation of this disclosure comprises a probability model update mechanism and an entropy decoding mechanism. The probability model update mechanism updates a probability model available for decoding encoded video data using a first number of bits. The entropy decoding mechanism uses a second number of bits to produce entropy decoded symbols based on the encoded video data. The second number of bits is less than the first number of bits.

These and other aspects of this disclosure are disclosed in the following detailed description of the implementations, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or frames, into smaller portions, such as blocks, and generating an output bitstream using techniques to limit the information included for respective blocks in the output. An encoded bitstream can be decoded to re-create the source images from the limited information. Typical video compression and decompression techniques use entropy coding to further reduce the number bits required to encode video data to or decode video data from a bitstream. For example, entropy coding may include using probability models reflecting the probability distributions of symbol values to encode to a bitstream, such as to reduce the amount of data that needs to be encoded.

The probabilities of a probability model reflect the likelihood that a particular symbol of video data (e.g., a quantized transform coefficient of a transform block) will have a particular value (e.g., 0 or 1 for binary cases or other values for non-binary cases). The probabilities of a probability model may be updated during encoding or decoding, such as based on observations of the symbol values to encode or decode. The probabilities are important to entropy coding because they are used to determine the number of bits required to code the symbols. For example, symbol values that are more probable may be coded using fewer bits, whereas values that are less probable may be coded using more bits.

The probabilities of a probability model may be stored in the form of a cumulative density function where the probability of a first symbol value is p0, the probability of a second symbol value is p0+p1, the probability of a third symbol value is p0+p1+p2, and so on. In some cases, there may be a maximum number of symbol values supported by a probability model (e.g., 15). To maintain precision, a number of bits equal to the maximum number of symbol values may be used (e.g., 15 bits) to store those probabilities.

As mentioned, the probability model is used for entropy coding symbols, either by entropy encoding the symbols to a bitstream or storage, or by entropy decoding the symbols from a bitstream or storage. The maximum throughput of the entropy coding is limited by the number of bits used by the probability model to store the probabilities of the different symbol values represented thereby. As such, the entropy coding has a higher throughput where fewer numbers of bits are used to store the probabilities of the probability model. However, using fewer numbers of bits to store those probabilities decreases the precision, and therefore the accuracy, of the probability model. There would be a loss to compression performance from using an inaccurate probability model.

Implementations of this disclosure address problems such as these using asymmetric probability model updating and entropy coding. Generally, asymmetric probability model updating and entropy coding refers to using different numbers of bits for storing probabilities of a probability model and for entropy coding symbols using that probability model. This is possible because the probability model update requires more precision to gradually converge to a true underlying stochastic process, whereas the entropy coding (e.g., using arithmetic coding) needs less precision to approximate a current entropy for symbols to encode or decode. Values for the probabilities of the probability model are stored using a higher precision (e.g., using M bits). The entropy coding instead uses a number of most significant bits (MSBs) of the probability model (e.g., N bits, where N is less than M).

Figure 1:
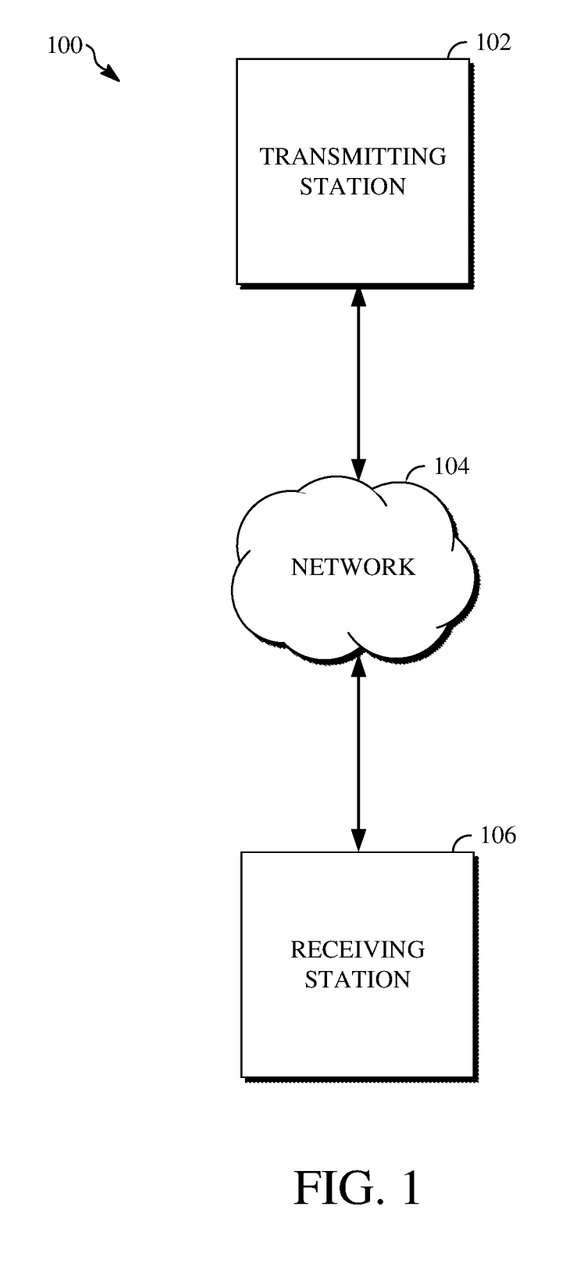
FIG. 1 is a schematic of an example of a video encoding and decoding system.

Further details of techniques for asymmetric probability model updating and entropy coding are described herein with initial reference to a system in which they can be implemented. FIG. 1 is a schematic of an example of a video encoding and decoding system 100. A transmitting station 102 can be, for example, a computer having an internal configuration of hardware such as that described in FIG. 2. However, other implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
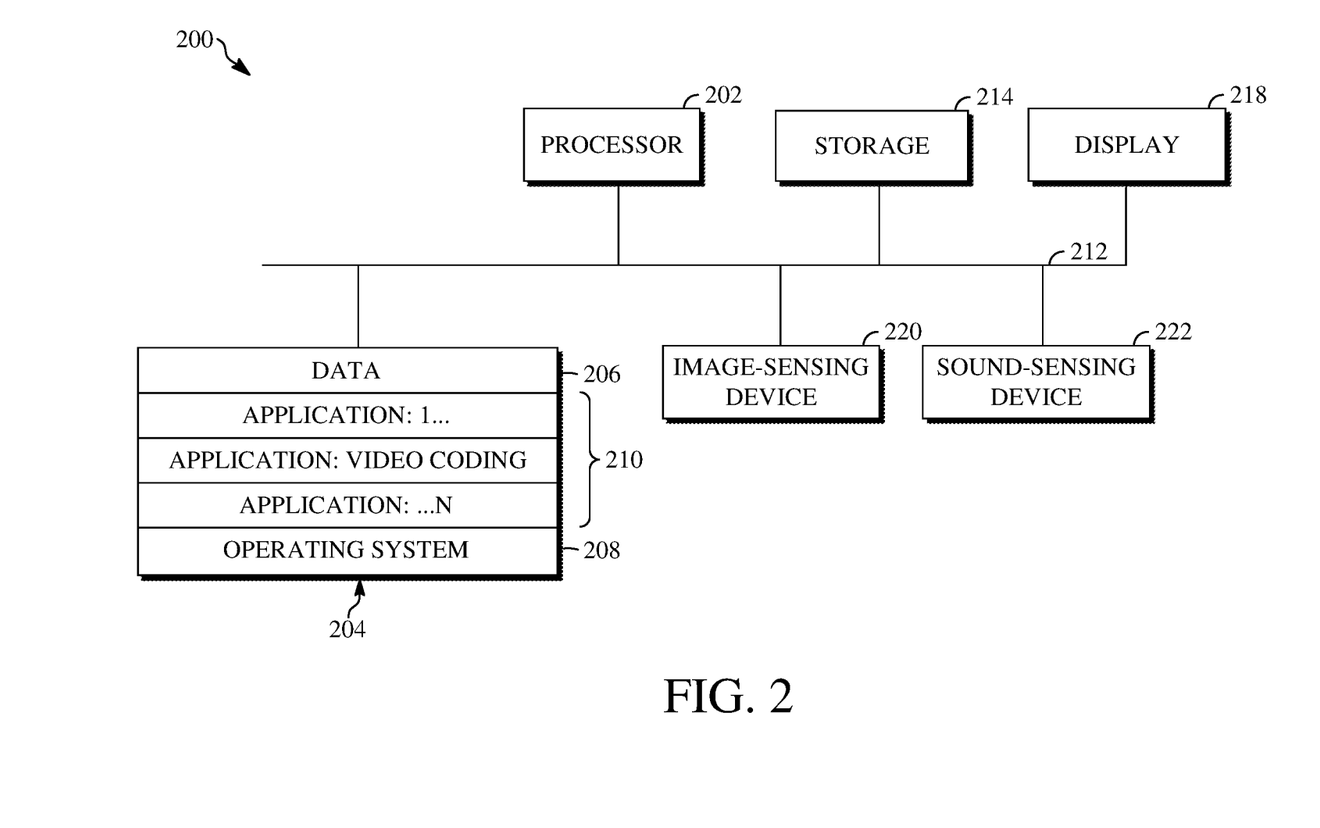
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

In some implementations, the video encoding and decoding system 100 may instead be used to encode and decode data other than video data. For example, the video encoding and decoding system 100 can be used to process image data. The image data may include a block of data from an image. In such an implementation, the transmitting station 102 may be used to encode the image data and the receiving station 106 may be used to decode the image data.

Alternatively, the receiving station 106 can represent a computing device that stores the encoded image data for later use, such as after receiving the encoded or pre-encoded image data from the transmitting station 102. As a further alternative, the transmitting station 102 can represent a computing device that decodes the image data, such as prior to transmitting the decoded image data to the receiving station 106 for display.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A processor 202 in the computing device 200 can be a conventional central processing unit. Alternatively, the processor 202 can be another type of device, or multiple devices, capable of manipulating or processing information now existing or hereafter developed. For example, although the disclosed implementations can be practiced with one processor as shown (e.g., the processor 202), advantages in speed and efficiency can be achieved by using more than one processor.

A memory 204 in computing device 200 can be a read only memory (ROM) device or a random access memory (RAM) device in an implementation. However, other suitable types of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include a video or image coding application that performs the techniques described herein.

The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into one unit, other configurations can be utilized. The operations of the processor 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
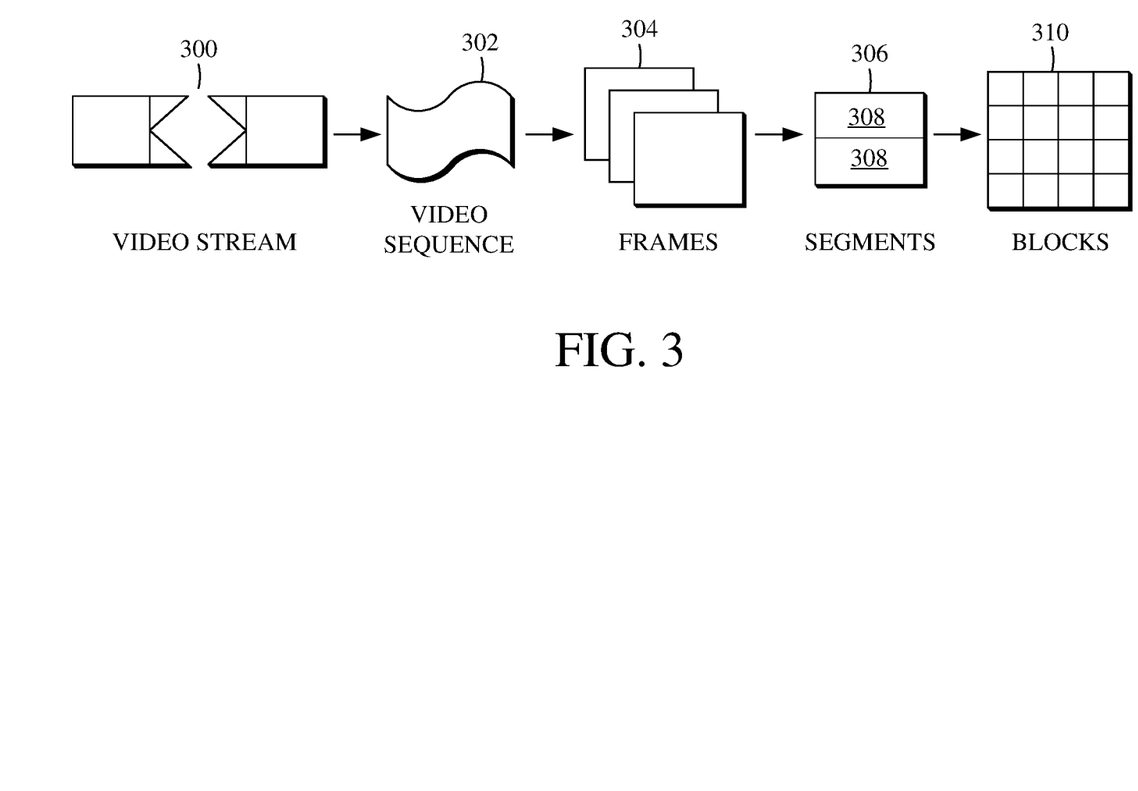
FIG. 3 is a diagram of an example of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306.

At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
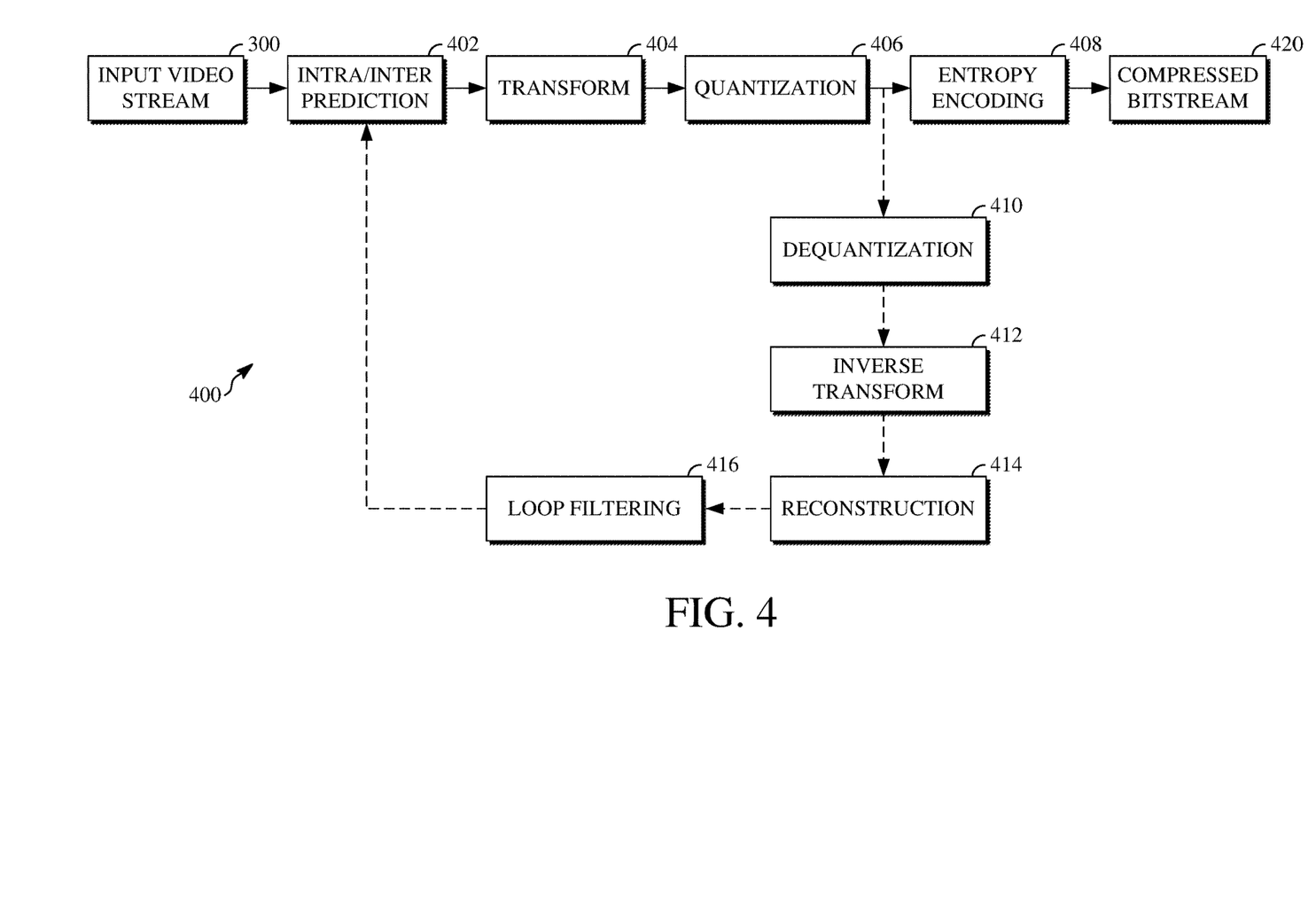
FIG. 4 is a block diagram of an example of an encoder according to implementations of this disclosure.

FIG. 4 is a block diagram of an example of an encoder 400. The encoder 400 can be implemented, as described above, in the transmitting station 102, such as by providing a computer software program stored in memory, for example, the memory 204. The computer software program can include machine instructions that, when executed by a processor such as the processor 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated.

The quantized transform coefficients are then entropy encoded by the entropy encoding stage 408. The entropy-encoded coefficients, together with other information used to decode the block (which may include, for example, syntax elements such as used to indicate the type of prediction used, transform type, motion vectors, a quantizer value, or the like), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path (shown by the dotted connection lines) can be used to ensure that the encoder 400 and a decoder 500 (described below with respect to FIG. 5) use the same reference frames to decode the compressed bitstream 420. The reconstruction path performs functions that are similar to functions that take place during the decoding process (described below with respect to FIG. 5), including dequantizing the quantized transform coefficients at the dequantization stage 410 and inverse transforming the dequantized transform coefficients at the inverse transform stage 412 to produce a derivative residual block (also called a derivative residual).

At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. In some implementations, a non-transform based encoder can quantize the residual signal directly without the transform stage 404 for certain blocks or frames. In some implementations, an encoder can have the quantization stage 406 and the dequantization stage 410 combined in a common stage.

Figure 5:
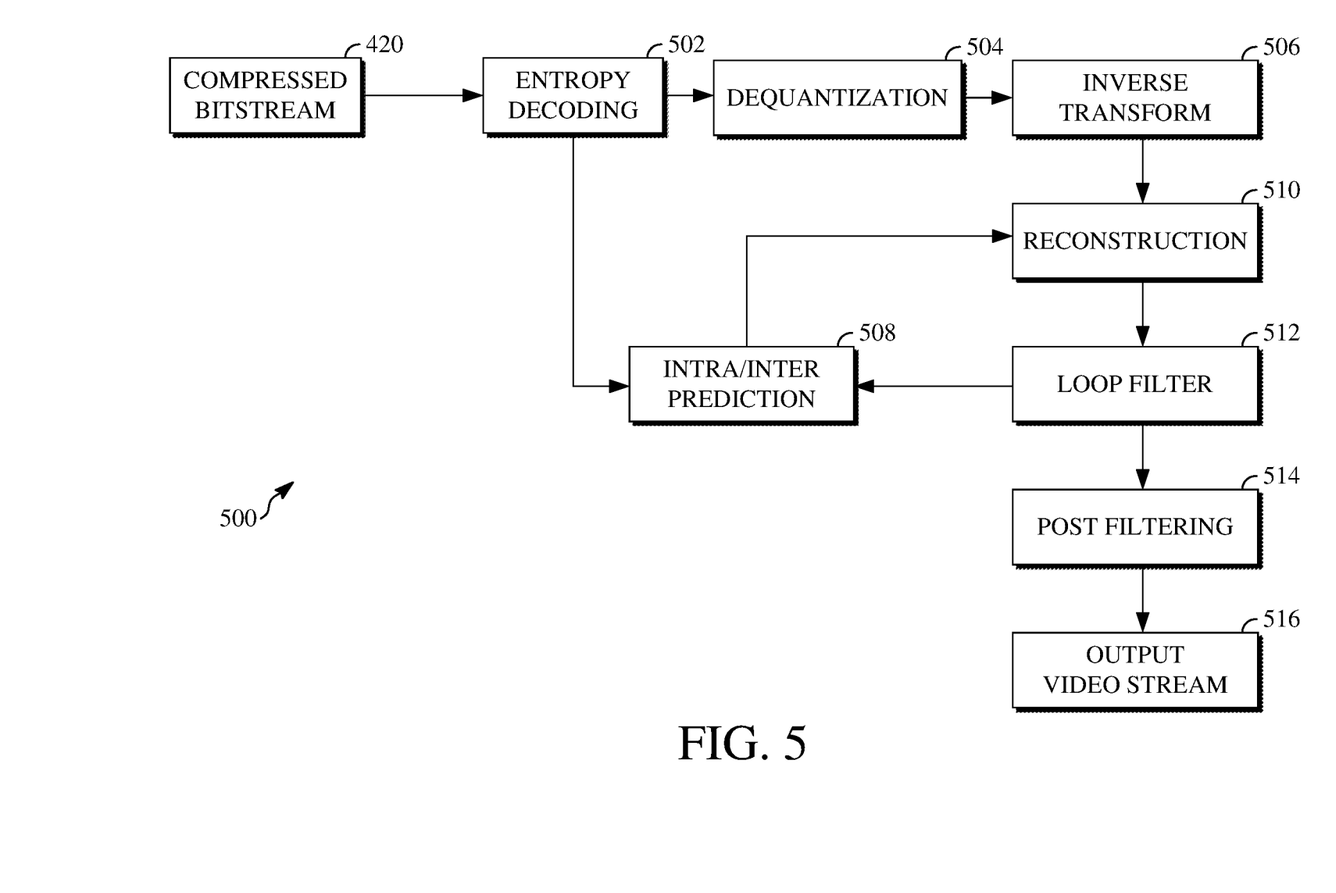
FIG. 5 is a block diagram of an example of a decoder according to implementations of this disclosure.

FIG. 5 is a block diagram of an example of a decoder 500. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400 (e.g., at the intra/inter prediction stage 402).

At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein.

Other variations of the decoder 500 can be used to decode the compressed bitstream 420. In some implementations, the decoder 500 can produce the output video stream 516 without the deblocking filtering stage 514.

Figure 6:
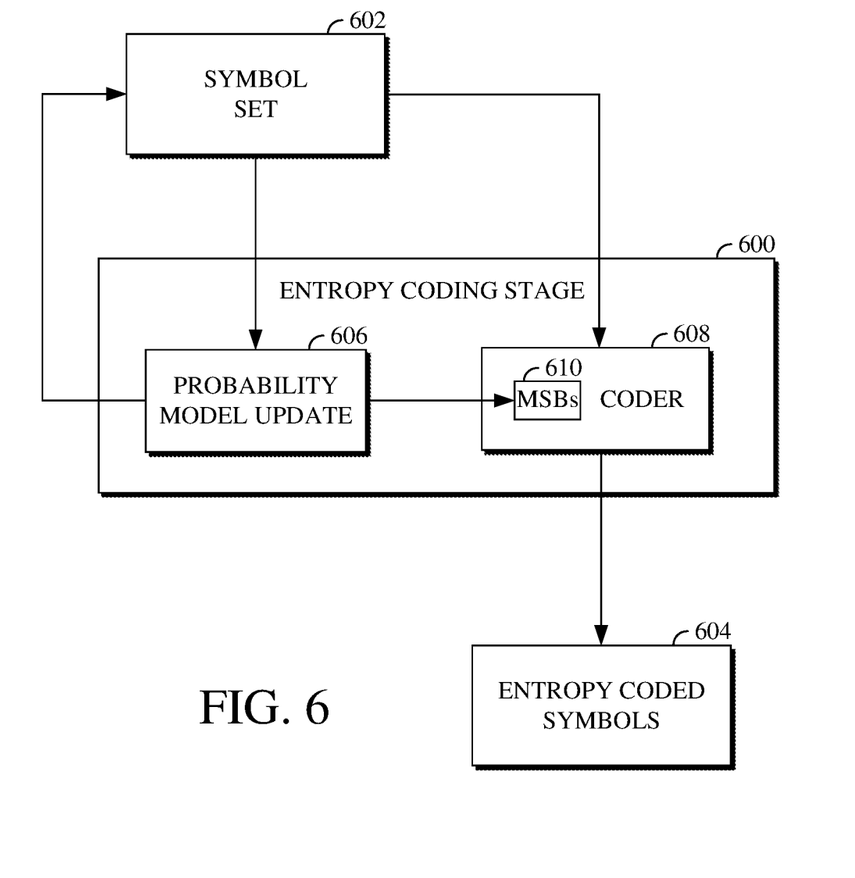
FIG. 6 is a block diagram of example of functionality of an entropy stage for entropy coding video data.

FIG. 6 is a block diagram of example of functionality of an entropy coding stage 600 for entropy coding video data. The entropy coding stage 600 may be or include the entropy encoding stage 408 shown in FIG. 4. Alternatively, the entropy coding stage 600 may be or include the entropy decoding stage 502 shown in FIG. 5. The entropy coding stage 600 receives and processes a symbol set 602 and subsequently outputs entropy coded symbols 604.

For example, during encoding, the entropy coding stage 600 may receive the symbol set 602 as output from a quantization stage, such as the quantization stage 406 shown in FIG. 4. The symbol set 602 in encoding may thus be or include quantized transform coefficients, and the entropy coded symbols 604 may be or include binarized or other video data to encode to a bitstream. In another example, during decoding, the entropy coding stage 600 may receive the symbol set 602 as part of the compressed bitstream 420 shown in FIG. 5. The symbol set 602 in decoding may thus be or include binarized or other video data encoded to a bitstream, and the entropy coded symbols 604 may be or include quantized transform coefficients to dequantize and inverse transform.

The entropy coding stage 600 includes a probability model update mechanism 606 and a coder 608. The probability model update mechanism 606 updates a probability model available for coding the symbol set 602 according to a probability distribution of the symbol set 602. The coder 608 performs entropy coding against the symbol set 602 to produce the entropy coded symbols 604. The coder 608 performs the entropy coding using updated probability model information determined using the probability model update mechanism 606. The coder 608 may be an entropy encoding mechanism during encoding or an entropy decoding mechanism during decoding.

The symbol set 602 includes a number of symbols, which may be commonly associated with a video aspect (e.g., a block of a video frame, a portion of a block, a segment or tile of a video frame, or another video aspect). The symbol set 602 may represent binarized video data such that each symbol of the symbol set 602 has a value of 0 or 1. Alternatively, the symbol set 602 may represent non-binary video data such that each symbol of the symbol set 602 may have a value of 0, 1, 2, or 3, or may have another value.

The probability model updated using the probability model update mechanism 606 stores probabilities for each possible value of the symbol set 602. For example, where the symbol set 602 represents binarized video data, the probability model includes a first probability for symbols having a value of 0 and a second probability for symbols having a value of 1. In another example, where the symbol set 602 represents non-binary video data, the probability model includes N probabilities, where N is the number of different values of the symbols of the symbol set 602.

The probability model update mechanism 606 updates the probability model on a symbol-by-symbol basis such that the probabilities of the probability model are updated after processing individual ones of the symbols. The probability model update mechanism 606 may process the symbols of the symbol set 602 sequentially, such as according to an order in which the symbols are arranged within the symbol set 602, or in a different order.

The probability model update mechanism 606 uses a first number of bits corresponding to a first bit precision to update and store the probabilities of the probability model. The first number of bits may, for example, be 15. As such, the probabilities of the probability model may be stored with 15-bit precision. However, other numbers of bits and bit precisions may instead be used to update and store the probabilities of the probability model.

After the probability model update mechanism 606 finishes updating the probability model (e.g., by updating the probabilities of the probability model based on a last symbol of the symbol set 602), a number of MSBs 610 of the probability model are determined. The number of MSBs 610 of the probability model may refer to the portion of the first number of bits that have the most significant values. Thus, the portion of the first number of bits having the most significant values may be the bits of the first number of bits with a value of 1. For example, for a bit string of 111110000000000, the five leftmost bits are the MSBs 610. In another example, for a bit string of 110011001100111, the number of MSBs 610 are the bits at the 2^0, 1, 2, 5, 6, 9, 10, 13, and 14 positions.

However, the number of MSBs 610 may be limited. For example, the entropy coding stage 600 (e.g., at the probability model update mechanism 606, the coder 608, or both) may be configured to pass along a particular number of MSBs 610 from the probability model for use in entropy coding the symbol set 602 by the coder 608. For example, the coder 608 can be limited to using 5, 6, 7, or 8 MSBs. In another example, less than 5 or more than 8 MSBs may be used.

Where a particular number of MSBs 610 is set, the portion of the first number of bits that represent the number of MSBs 610 may refer to the leftmost such set number of bits having a value of 1. For example, for a bit string of 11100111000110 where the entropy coding is limited to using 5 MSBs, the number of MSBs 610 are the bits in the 2^8, 9, 12, 13, and 14 positions. The particular number of MSBs 610 may have an effect on the overall compression throughput. For example, as described below with respect to FIG. 8, a larger compression throughput may be obtained by using a lower number of MSBs 610. The number of MSBs 610 to use may be set by default, according to user input, based on empirical data, statistical analysis, machine learning, or the like.

The coder 608 may be configured to use the particular number of MSBs 610. The probability model update mechanism 606 may make all values of the probabilities according to the first bit precision available to the coder 608. The coder 608 may then select the number of MSBs 610 based on the provided values and the configured number of MSBs 610. Alternatively, the coder 608 can retrieve the configured number of MSBs 610 from the probability model update mechanism 606.

As a further alternative, after updating the probabilities of the probability model, the probability model update mechanism 606 may output the values of the updated probabilities to memory (e.g., within a table or other data store). For example, the probability model update mechanism 606 can output only the configured number of MSBs 610 to the memory. In another example, the probability model update mechanism 606 can output all values of the probabilities to the memory and the coder 608 can retrieve only the configured number of MSBs 610 from the memory thereafter.

The number of MSBs 610 is a different number of bits than the first number of bits. As such, the number of MSBs 610 can be a second number of bits corresponding to a second bit precision. The coder 608 uses the values of the probabilities as represented using the second bit precision to entropy code the symbol set 602. Thus, the symbol set 602 is processed using different bit precisions for updating the probability model and for entropy coding. Using these different bit precisions to update the probabilities of the probability model and to entropy code the symbol set 602 allows the entropy coding stage 600 to maintain accurate probabilities while improving the overall compression throughout.

In some implementations, the number of MSBs 610 may correspond to the number of probabilities stored by the probability model updated using the probability model update mechanism 606. That is, the number of MSBs 610 may be increased in cases where the symbol set 602 represents non-binary video data, such as to maintain a good compression efficiency. For example, fewer MSBs may be necessary where the probability model is limited to probabilities for binary values than where the probability model stores a larger number of probabilities. This is because using fewer MSBs generally reduces the precision of the entropy coding. Entropy coding binary values typically requires less precision than entropy coding non-binary values.

In some implementations, the probabilities of the probability model may be renormalized before the coder 608 uses the number of MSBs 610 to entropy code the symbol set 602. For example, the probability model may reflect probabilities of binary values. In some cases, the probability of the value 0 may be much larger than the probability of the value 1. By using a particular number of MSBs 610, it may be determined that the probability of the value 0 is 1 and the probability of the value 1 is 0, even if this is not entirely accurate. As such, those probabilities can be renormalized by adding one bit thereto. For example, where 5 MSBs are used, the probability of the value 0 may be renormalized to $1+(\frac{1}{2}^5)=1\frac{1}{32}$, and the probability of the value 1 may be renormalized to $0+(\frac{1}{2}^5)=\frac{1}{32}$. Renormalizing the probabilities accordingly may create a more meaningful distribution for the entropy coding.

Figure 7:
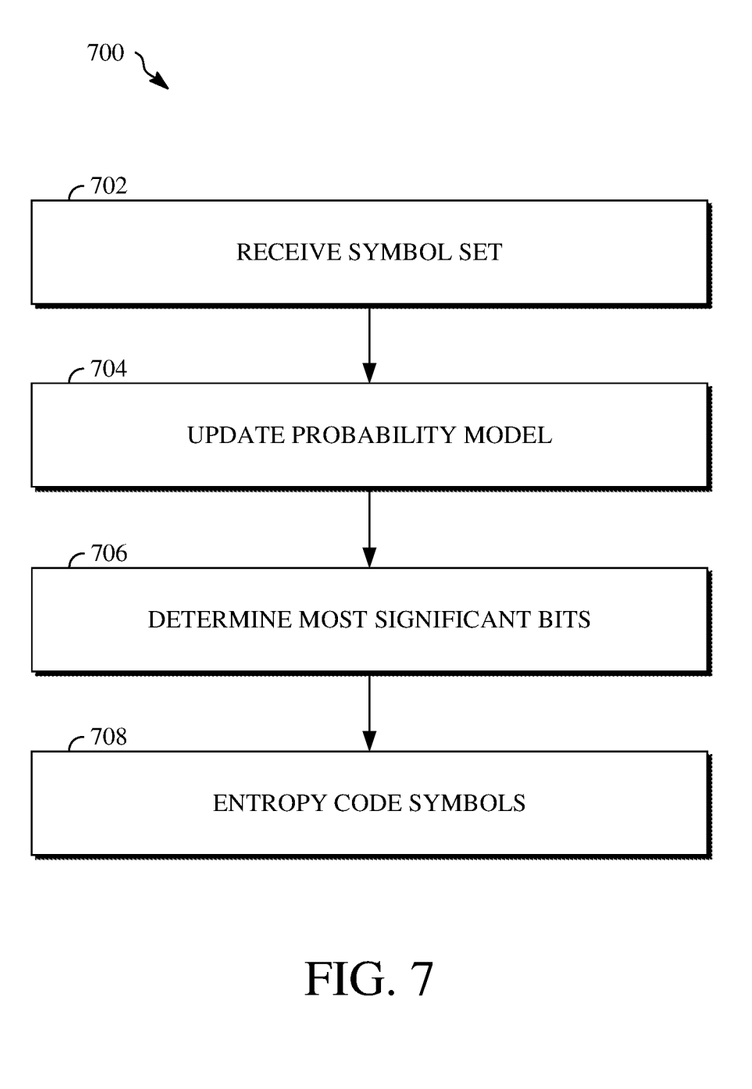
FIG. 7 is a flowchart diagram of an example of a technique for asymmetric probability model updating and entropy coding.

FIG. 7 is a flowchart diagram of an example of a technique 700 for asymmetric probability model updating and entropy coding. The technique 700 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the processor 202, may cause the computing device to perform the technique 700. The technique 700 can be implemented using specialized hardware or firmware. For example, a hardware component configured to perform the technique 700. As explained above, some computing devices may have multiple memories or processors, and the operations described in the technique 700 can be distributed using multiple processors, memories, or both.

For simplicity of explanation, the technique described with respect to FIG. 7 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a symbol set is received. The symbol set includes symbols associated with video data. In that the technique 700 can be performed for entropy encoding video data or for entropy decoding video data, the symbols may in some cases be associated with encoded video data. For example, during encoding, the symbol set can be received as output from a quantization stage of an encoder (e.g., the quantization stage 406 shown in FIG. 4). The symbol set in encoding may thus be or include quantized transform coefficients. In another example, during decoding, the symbol set can be received from or based on syntax elements decoded from a bitstream (e.g., the compressed bitstream 420 shown in FIG. 5). The symbol set in decoding may thus be or include binarized or other video data encoded to a bitstream.

At 704, a probability model is updated. The probability model includes probabilities associated with possible values of the symbols of the symbol set. For example, the probability model may be a cumulative distribution function array. The probabilities of the probability model are stored using a first number of bits corresponding to a first bit precision. The probabilities may represent possible values of binary values for the symbols, such as where the encoded video data represented by the symbol set are or include binary values. Alternatively, the probabilities may represent possible values of non-binary values for the symbols, such as where the encoded video data represented by the symbol set are or include non-binary values.

Updating the probability model includes updating the probabilities of the probability model according to the values of the symbols. For example, the probabilities of the probability model may be updated after processing each symbol of the symbol set. In such an example, where the symbol set includes N symbols, the probability model would be updated N times. In another example, the probabilities of the probability model may be updated after a certain number of symbols is processed (e.g., every five symbols). In yet another example, the probabilities of the probability model may be updated once after the entire symbol set has been processed.

At 706, a number of MSBs of the probability model are determined. The number of MSBs are determined based on the updated probabilities of the probability model. The number of MSBs represent a portion of the first number of bits used to store the probabilities, which portion reflects, indicates, or otherwise includes the most significant values of the probabilities. The number of MSBs is represented using a second number of bits corresponding to a second bit precision. The second number of bits is smaller than the first number of bits. As such, a value represented using the second bit precision has fewer digits than it would when represented using the first bit precision.

Determining the number of MSBs of the probability model can include determining a number of bits by which to reduce the first bit precision based on the updated probabilities of the probability model. For example, given that the second number of bits is a subset of the first number of bits, the number of bits by which to reduce the first bit precision can be determined based on a number of value spaces of the first bit precision having a value of 0 for some or all of the updated probabilities. The second bit precision can then be determined based on the number of bits, such as based on a difference between the first number of bits and the determined number of bits.

At 708, the symbols of the symbol set are entropy coded. The symbols are entropy coded using the number of MSBs of the probability model (e.g., the second number of bits). Entropy coding the symbols can include arithmetic coding the symbols using the second bit precision associated with the number of MSBs. The number of MSBs represent the bits to use to entropy code the symbol set. As such, the entropy coding uses fewer bits than the probability model updating. For example, the first number of bits may be 15 bits and the second number of bits may be 7 bits. Thus, a first compression throughput resulting from entropy coding the symbols using the first bit precision is less than a second compression throughput resulting from entropy coding the symbols using the second bit precision.

In some implementations, the technique 700 includes decoding syntax elements representing the encoded video data from a bitstream. For example, when the technique 700 is performed for entropy decoding symbols, the syntax elements may be syntax elements representing those symbols. The syntax elements may be decoded from a bitstream, such as a bitstream produced by encoding video data.

In some implementations, the technique 700 can include other operations for encoding or decoding video data. For example, during encoding, the technique 700 can include generating a prediction residual for the video data such as based on motion predicted for the video data, transforming the prediction residual to produce transform coefficients, and quantizing the transform coefficients to produce quantized transform coefficients. The quantized transform coefficients may be or include the symbol set processed by the technique 700.

In another example, during decoding, the technique 700 can include producing quantized transform coefficients from the entropy decoding of the symbols, dequantizing the quantized transform coefficients to produce transform coefficients, inverse transforming the transform coefficients to produce a prediction residual, reconstructing video data using the prediction residual to produce decoded video data, and outputting the decoded video data (e.g., to an output video stream).

Figure 8:
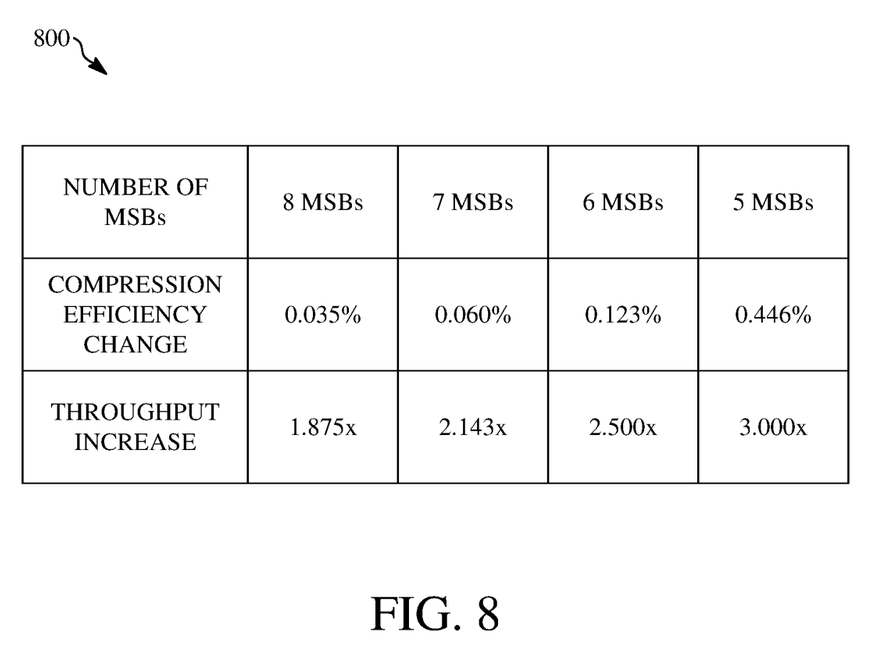
FIG. 8 is an illustration of an example of a table showing compression efficiency changes and throughput increases resulting from using the implementations of this disclosure.

FIG. 8 is an illustration of an example of a table 800 showing compression efficiency changes and throughput increases resulting from using the implementations of this disclosure. The results shown are examples from using 5 MSBs, 6 MSBs, 7 MSBs, and 8 MSBs. However, other results may be possible using 5 MSBs, 6 MSBs, 7 MSBs, and 8 MSBs. Additionally, other numbers of MSBs beyond 5 MSBs, 6 MSBs, 7 MSBs, and 8 MSBs may be used with the implementations of this disclosure. Those numbers are simply provided by example.

The percentages shown for the compression efficiency change refer to the percentage loss to compression performance from using those numbers of MSBs for entropy coding. As can be seen in the table 800, the percentage of compression efficiency change increases as the number of MSBs decreases. For example, using 8 MSBs may result in a percentage loss to compression performance of 0.035 percent, whereas using 5 MSBs may result in a percentage loss to compression performance of 0.446 percent.

Separately, the multiplier values shown for the throughput increases refer to a multiplied increase in the compression throughput from using those numbers of MSBs as compared to a default value, such as the number of bits used to update a probability model (e.g., 15 bits). As can be seen in the table, 800, the multiplier value for the throughput increases increase as the number of MSBs decreases. For example, using 7 MSBs may result in a 2.143 times greater throughput than using the default number of bits for entropy coding, whereas using 6 MSBs may result in a 2.500 times greater throughput than using that default number of bits.

The example data shown in the table 800 represents the relationship between the number of MSBs used and the overall performance of an entropy coder using the implementations of this disclosure. In particular, the example data reflects that using fewer MSBs for entropy coding results in nominal compression loss, which may not ultimately affect the quality of the subject output video stream, but that doing so also results in a potentially significant increase in compression performance by the increased throughput.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for decoding encoded video data using a bit precision determined based on a probability model, the method comprising:
   decoding syntax elements representing the encoded video data from a bitstream;
   updating probabilities of a probability model according to values of the syntax elements, the probabilities associated with possible values of the syntax elements, the probabilities stored using a first bit precision;
   determining, based on the updated probabilities, a second bit precision to use to entropy decode the syntax elements, wherein the second bit precision is less than the first bit precision;
   entropy decoding all of the syntax elements using the second bit precision to produce quantized transform coefficients;
   dequantizing the quantized transform coefficients to produce transform coefficients;
   inverse transforming the transform coefficients to produce a prediction residual;
   reconstructing the prediction residual to produce a decoded block; and
   outputting the decoded block to an output video stream.

2. The method of claim 1, wherein a first compression throughput resulting from entropy decoding the syntax elements using the first bit precision is less than a second compression throughput resulting from entropy decoding the syntax elements using the second bit precision.

3. The method of claim 1, wherein updating the probabilities of the probability model according to the values of the syntax elements comprises:
updating at least one of the probabilities after processing individual ones of the syntax elements.

4. The method of claim 1, wherein determining the second bit precision to use to entropy decode the syntax elements comprises:
determining a number of bits by which to reduce the first bit precision based on the updated probabilities; and
determining the second bit precision based on the number of bits.

5. The method of claim 1, wherein entropy decoding the syntax elements using the second bit precision to produce the quantized transform coefficients comprises:
arithmetic coding the syntax elements using the second bit precision.

6. The method of claim 1, wherein the encoded video data includes non-binary symbols.

7. The method of claim 1, wherein the first bit precision is a 15-bit precision and the second bit precision is a 7-bit precision.

8. The method of claim 1, wherein the probability model is a cumulative distribution function array.

9. An apparatus for decoding encoded video data, the apparatus comprising:
a processor configured to execute instructions stored in a non-transitory storage medium to:
receive symbols associated with the encoded video data;
update a probability model based on values of the symbols, the probability model including probabilities associated with possible values of the symbols, the probabilities stored using a first number of bits;
determine, based on the updated probability model, a second number of bits to use to entropy decode the symbols, wherein the second number of bits is a subset of the first number of bits; and
entropy decode all of the symbols using the second number of bits.

10. The apparatus of claim 9, wherein a first compression throughput resulting from entropy decoding the symbols using the first number of bits is less than a second compression throughput resulting from entropy decoding the symbols using the second number of bits.

11. The apparatus of claim 9, wherein the probability model is updated according to a first bit precision corresponding to the first number of bits, wherein the symbols are entropy decoded according to a second bit precision corresponding to the second number of bits, wherein the second bit precision is less than the first bit precision.

12. The apparatus of claim 9, wherein the instructions to update the probability model based on the values of the symbols include instructions to:
update at least one of the probabilities after processing individual ones of the symbols.

13. The apparatus of claim 9, wherein the instructions to determine the second number of bits to use to entropy decode the symbols include instructions to:
determine a number of bits by which to reduce the first number of bits based on the probabilities of the updated probability model.

14. The apparatus of claim 9, wherein at least some of the symbols have non-binary values.

15. The apparatus of claim 9, wherein the first number of bits is 15 bits and the second number of bits is 7 bits.

16. The apparatus of claim 9, wherein the probability model is a cumulative distribution function array.

17. A method, comprising:
receiving encoded video data from a bitstream;
updating a probability model using a first number of bits based on the encoded video data; and
using a second number of bits determined based on the updated probability model to entropy decode all of the encoded video data, wherein the second number of bits is less that the first number of bits.

18. The method of claim 17, wherein a first compression throughput resulting from entropy decoding the encoded video data using the first number of bits is less than a second compression throughput resulting from entropy decoding the encoded video data using the second number of bits.

19. The method of claim 17, further comprising:
receiving data indicative of the second number of bits based on the probability model update.

20. The method of claim 17, wherein the second number of bits represent a number of most significant bits of the first number of bits.

* * * * *